Sept. 17, 1935.   R. C. SPRAGUE   2,014,399
PROCESS FOR THE MANUFACTURE OF ELECTRICAL CONDENSERS
Filed June 1, 1929   2 Sheets-Sheet 1

INVENTOR.
Robert C. Sprague
BY Dorsey & Cole
ATTORNEYS.

Sept. 17, 1935.    R. C. SPRAGUE    2,014,399

PROCESS FOR THE MANUFACTURE OF ELECTRICAL CONDENSERS

Filed June 1, 1929    2 Sheets-Sheet 2

INVENTOR.
Robert C. Sprague
BY Dorsey & Cole
ATTORNEYS.

Patented Sept. 17, 1935

2,014,399

UNITED STATES PATENT OFFICE 2,014,399

PROCESS FOR THE MANUFACTURE OF ELECTRICAL CONDENSERS

Robert C. Sprague, Quincy, Mass., assignor to Sprague Specialties Co., North Adams, Mass., a corporation of Massachusetts Application June 1, 1929, Serial No. 367,749

2 Claims. (Cl. 175—41)

The present invention relates to a process to be employed in the manufacture of electric condensers.

In my co-pending application Ser. No. 266,921, filed Apr. 3, 1928, and its continuation Ser. No. 331,292, filed Jan. 9, 1929, of both of which this application is a continuation in part, I have described condensers characterized by the presence of very thin layers of paraffin or like material, interposed between the layers of impregnated paper and metal foil, whereby the breakdown voltage of the condenser is greatly increased without substantially increasing its thickness.

The object of the present invention is to provide a simple and convenient method for the interposition of these thin dielectric layers, by which uniformity in the thickness and dielectric strength of these layers throughout the whole condenser is obtained.

In the accompanying drawings of this application Figure 1 is a section showing schematically a two-plate condenser made in accordance with my invention.

Figure 1:
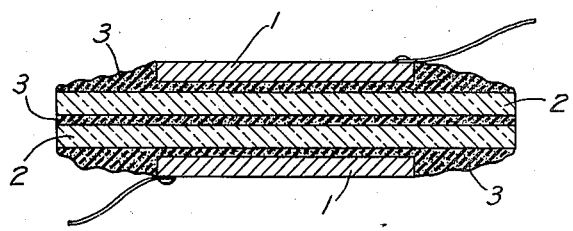

Referring now to Fig. 1, which is a schematic representation of one form of the condensers described in my aforesaid applications, there are shown two conducting plates 1—1 separated by five layers of dielectric material, of which two layers 2—2 are formed by paraffin impregnated paper and three layers 3—3—3 of paraffin.

Figure 2:
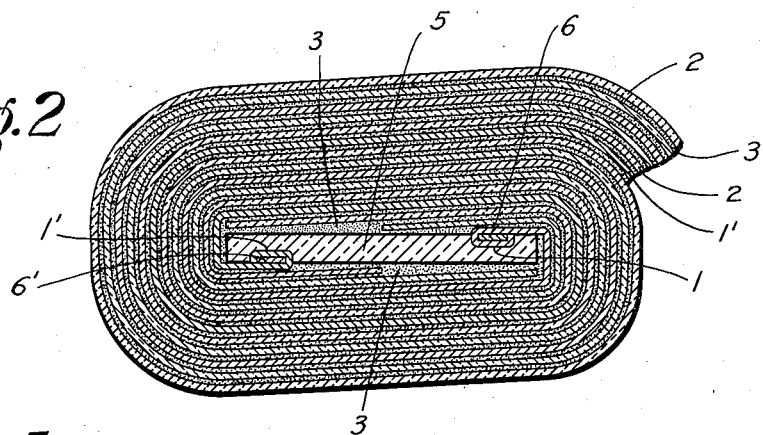
Fig. 2 is a section of a wound type condenser made in accordance with my invention.
Figure 5:
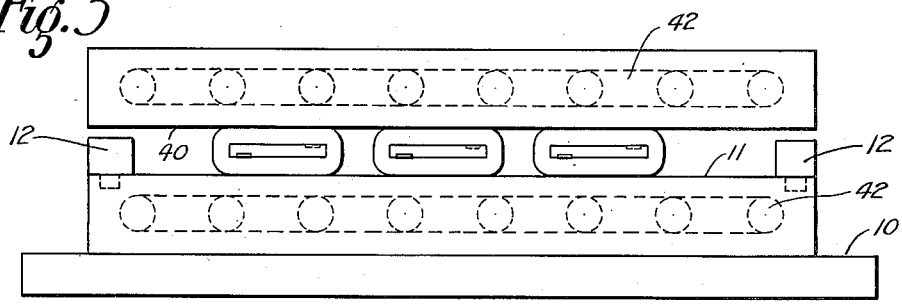
Fig. 5 is a front view of the plates embodied in the press shown in Figs. 3 and 4, showing the condensers inserted between the plates before the condensers are compressed.
Figure 6:
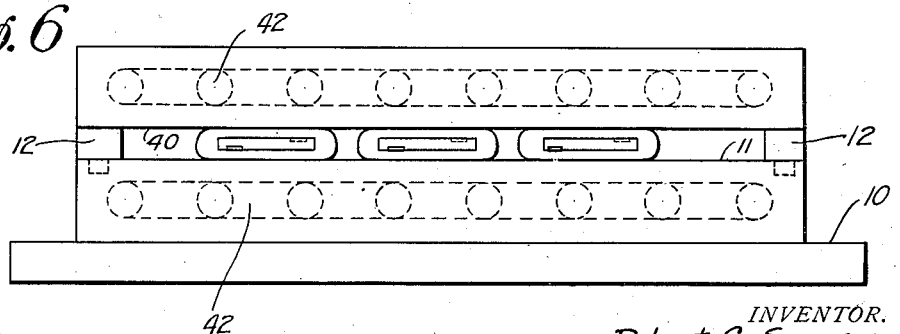
Fig. 6 is a view similar to Fig. 5, but with the condensers compressed to the desired thickness.

Fig. 2 shows a condenser of the wound type as disclosed in my said application Ser. No. 331,292. This condenser comprises a base 5, preferably of fibre or similar material, provided with recesses in which are embedded leads or electrodes 6 and 6' of copper or other suitable conductive material. Connected with each of the leads 6 and 6' are sheets of metal foil 1 and 1' respectively; the foils are preferably wound around the leads or secured thereto by adhesive material or other means. In like manner as in the condenser of Fig. 1 there are interposed between the metal foils 1 and 1' five dielectric layers, namely, two layers of paraffined paper 2—2 and three layers or paraffin 3—3—3. The two metal foils with the intervening dielectric layers are wound into a coil.

While I have referred to the dielectric as being composed of layers of paraffined paper and paraffin and as being composed of five layers, as pointed out in the above referred to application, my invention is in no way limited to such dielectrics nor to the stated number of dielectric layers.

In the first manufacturing stages of such condensers, various processes may be used. Assuming that my invention is to be applied to paraffin impregnated paper condensers of comparatively large capacities, then, according to well-known practice, the metal foil and paper layers may be wound into a coil and this assembly impregnated with paraffin—by vacuum process if so desired—or, for instance, as suggested in my co-pending application Ser. No. 135,342 of Sept. 14, 1926, of which the present application is a continuation in part, one layer of metal foil and one or more layers of impregnated paper may be united into a composite strip by means of paraffin or other material and two such composite strips wound together to form the condenser.

It should be noted that the condensers are wound sufficiently loose to take up an excess of paraffin during their impregnation.

Irrespective of the exact process employed in the first manufacturing stages, I prefer to form the thin interposed dielectric layers of my condensers by immersing the condenser assemblies in a bath consisting of the proposed dielectric, the temperature of this bath being considerably above the melting point of the dielectric. In the case of paraffin paper condensers and using paraffin for the dielectric layers to be interposed, I have found 260° to 280° F. as a suitable temperature. These figures are to be understood as suggested for illustrative purposes and are not to constitute a limitation upon my invention. The condenser assemblies should be left in this bath until a thorough impregnation throughout the whole assembly is obtained. The immersion of the condensers in this bath may replace altogether the usual impregnating process.

From this first bath the condensers are placed into a second bath of a considerably lower temperature, this temperature preferably only slightly exceeding the melting point of the paraffin (or other proposed dielectric). In the case of paraffin, for instance, suitable temperatures have been found to be between 130° and 180° F., the exact temperature depending on the proposed thickness of the paraffin layers to be interposed. These figures are to be understood as suggested for illustrative purposes and are not to constitute a limitation upon my invention. The condensers are left in this second bath until their temperature throughout the whole condenser has substantially attained the temperature of this bath.

Instead of using two separate baths, namely, one of higher and another of a lower temperature, it is feasible to use a single bath which is kept first at the higher temperature and which, after completed impregnation of the condensers, is cooled down to the proper lower temperature.

I have found it very convenient to place the condensers in pans and first impregnate them in the high temperature bath in the usual way. When the impregnation process is completed the pans containing the condensers are taken out and allowed to cool down to a temperature around that of the low temperature bath. The pans are then placed in this second bath which is thermostatically controlled to maintain it at a uniform temperature.

Figure 3:
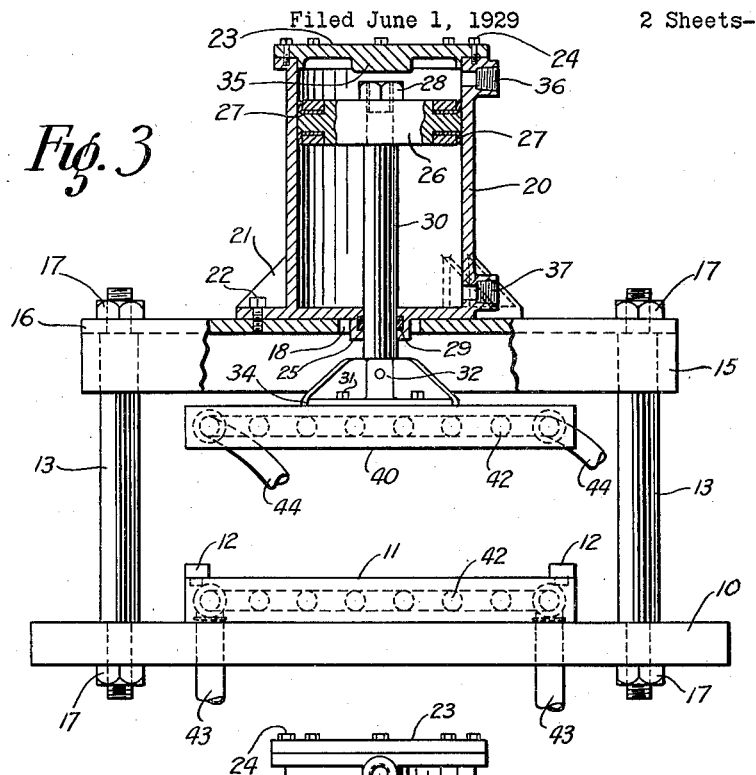
Fig. 3 is a front view partly in section showing in a schematic way a press which may be conveniently employed in carrying out my invention in the manufacture of condensers of the type illustrated in Figs. 1 and 2.
Figure 4:
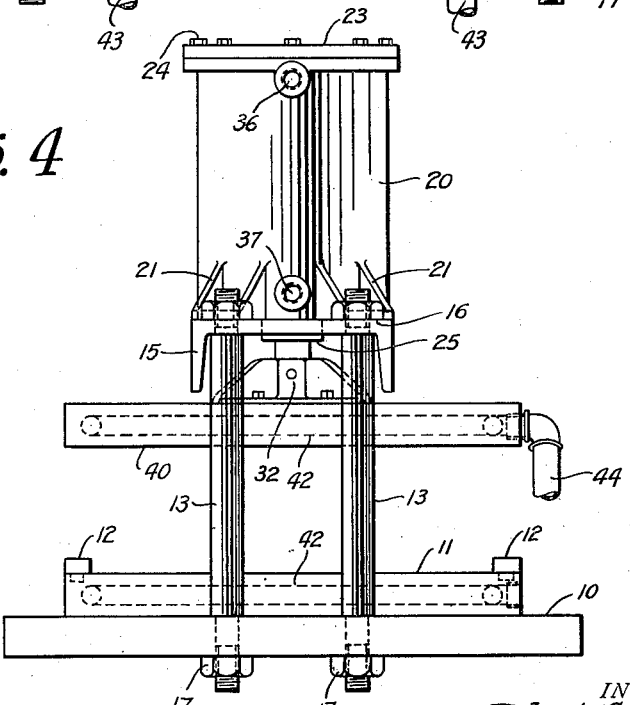
Fig. 4 is a side view of the press illustrated in Fig. 3.

Upon removal of the condensers from the low temperature bath, they are placed immediately in a suitable press such as, for example, illustrated in Figs. 3 and 4.

This press consists of a base 10, to which is secured the lower pressing plate 11.

Supported by four stanchions 13 anchored in the base 10 is a channel iron 14 with its flanges 15 turned downwardly, the stanchions 13 being secured to the base 10 and the web 16 of the angle iron 14 by means of nuts 17. The web 16 is provided with a central aperture 18.

Supported by the web 16 is a cylinder 20 provided on one side of its bottom with three ribbed extension lugs 21 through which it is fastened by means of screws 22 to the base 10. A cover 23 provided on the top of the cylinder 20 is secured to the latter by means of bolts 24.

Reciprocally located within the cylinder 20 is a piston 26 provided with suitable packing rings 27. Connected to the piston 26 and secured thereto by means of a nut 28 is a piston rod 30 the free end of which protrudes through the central portion 25 of the cylinder bottom, the portion 25 constituting a bushing which is provided with a packing leather 29.

The free end of the piston rod 30 carries a ribbed connecting casting 31, connection between the rod 30 and the casting 31 being made by a bolt or other suitable means.

Fixedly connected to the bottom plate 34 of the casting 31 is a pressing plate 40. Means are provided whereby the plate 40 is adjustably fixed in the limit of its downward travel such as by replaceable stops 12 conveniently attached at the four corners of the fixed plate 11.

A central boss 35 of the cover 23 cooperating with the nut 29 acts as a stop for the piston in its upward motion.

The cylinder 20 is provided with an upper port 36 and a lower port 37, through which the motive agent for the actuation of the piston 26 (which may be compressed air, steam, etc.), is admitted to and released from the cylinder. Assuming the use of pressure air, if the piston is to be moved downward the port 37 is connected to atmosphere and the port 36 connected to a supply of pressure air; the opposite connections being made if the piston is to be moved upward.

As it is advisable to cool the presses during the pressing operation, I prefer to make the plates 11—40 hollow and place in these hollows cooling coils 42 which are connected with flexible water pipes 43—43 and 44—44 respectively. The cooling water is preferably circulated through a refrigerating system and thereby maintained at a temperature of 45° to 50° F. These figures are to be understood as suggested for illustrative purposes and are not to constitute a limitation upon my invention.

The condensers after being removed from the second bath preferably are placed immediately—without allowing them to further cool down—on the bottom plate 11 of the press. As described before, this plate is provided with stops 12 so that the condensers, instead of being fully compressed, are compressed to a predetermined thickness whereby the excess dielectric is squeezed out but thin layers thereof are retained between the impregnated paper layers. Compression of the condensers prepared as above set forth to a predetermined thickness in accordance with the method now under description effects the surprising, but highly valuable result, that the intermediate dielectric layers so obtained are quite uniform, both in regard to thickness as well as dielectric strength throughout the whole condenser.

In my aforesaid application Ser. No. 331,292, I have described the advantages obtained by the interpositions of such thin dielectric layers, and also discussed the influence of the thickness of these layers on the breakdown voltage of the condenser. The heights of the stops 12 as stated are so selected as to obtain interposed dielectric layers of a predetermined thickness. The most convenient thickness of such layers depends on various factors as, for instance, the dielectric employed, the construction and dimensions of the condensers, and the required breakdown voltage. In the case of paraffin I select, as a rule, a thickness of .00003" to .00017" for the individual dielectric layers, whereby in general I use thinner layers in the case of condensers having cores than in the case of coreless condensers. However, it should be noted that the above given values do not constitute sharp limits and satisfactory results have been obtained both with thinner and thicker layers.

In the following it will be shown how for a predetermined thickness of the interposed dielectric layers, the height of the stops 12 is computed.

Assume that a condenser is to be made, having forty turns and employing two layers of .0005" thick paper and .0003" thick aluminum foil and that the condenser is wound without central core and covered by a single lap of bond paper, the total thickness of which is .01"; furthermore, that paraffin is used, both for the impregnation of the paper as well as a medium for the interposed dielectric layers. If it is now desired to obtain paraffin layers having an individual thickness of .00015" (not making allowance, for the time being, for contraction which takes place when the condensers cool down to ambient temperature from the temperature at which the compression took place), the height of the stops can be computed as follows:

Each turn comprises four layers of paper, two layers of aluminum foil and six interposed layers of paraffin, the double thickness of these twelve layers constituting the total thickness of a turn, which is thus equal to:

$$2\ (4\times.0005''+2\times.0003''+6\times.00015'') = .0070''$$

The thickness of forty turns then equals:

$$40\times.007''=.280''$$

to which by adding the wrapper thickness of .01", we obtain .290" as the total thickness to which the condenser is to be compressed. The height of the stops 12 therefore, should be .290" in this case.

As previously implied, the condensers contract after their cooling down from the pressing temperature to ambient temperature. For instance, in the case just discussed the total thickness of the condenser reduces in cooling from .290" to about .275"; the thickness of the intermediate dielectric layers reduces thereby from .00015" to about .00012" as practically the whole contraction in the thickness of the condenser is due to the contraction of the intermediate paraffin layers.

As the pressure with which the condensers are compressed I prefer to use about ten pounds per square inch. However, satisfactory results are obtained both with lower and higher pressures.

As above stated the suggested temperature of the second bath (and thus the approximate pressing temperature) may conveniently vary between 130° to 180° F., depending on the proposed thickness of the intermediate paraffin layer. In the example just considered, a pressing temperature of 130° F. is well suited, this being approximately the temperature at which paraffin starts to solidify. It should be understood that with compounds having higher solidification points, higher bath and pressing temperatures have to be used.

The time during which the condensers are being pressed may vary with the size of the condensers and the dielectric used, and is effectively reduced by cooling the press.

While I have described and illustrated my invention in connection with certain physical embodiments, it should be well understood that my invention is not limited thereto. As stated in my previously referred to applications, various materials for the interposed dielectric layers or for the impregnating medium may be used. It should be also understood that the proper temperature and the thickness of layers varies for various dielectrics. Instead of using separate layers of paper and metal foil, metal coated paper may be used. In this case, of course, no paraffin layer will be interposed between the paper and its metal coating.

The foregoing detailed description has been given for clearness of understanding and no undue limitations should be deduced therefrom, but the appended claims should be construed as broadly as possible in view of the prior art.

What I claim and desire to secure by Letters Patent is:

1. In the manufacture of electrical condensers the process which comprises assembling layers of dielectric material and metallic foil, impregnating said assembly with a dielectric medium by initially subjecting the assembly to the action of the dielectric medium at a temperature whereby the dielectric medium is easily fluid, and finally subjecting the assembly to such action at a temperature not greatly exceeding the solidification of said medium, and compressing the assembly so impregnated to a predetermined thickness to obtain interposed layers of said dielectric medium having a fixed thickness.

2. In the manufacture of electrical condensers the process which comprises assembling layers of dielectric material and metallic coil, impregnating said assembly with a dielectric medium in a bath thereof having a temperature whereby said dielectric medium is easily fluid, immerging said impregnated assembly in a second bath of said medium, said second bath having a temperature not greatly exceeding the solidification point of said medium and compressing the assembly so impregnated to a predetermined thickness to obtain interposed layers of said dielectric medium having a fixed thickness.

ROBERT C. SPRAGUE.